UNITED STATES PATENT OFFICE.

RALPH E. MONTONNA, OF SYRACUSE, NEW YORK, ASSIGNOR TO SEMET-SOLVAY COMPANY, OF SOLVAY, NEW YORK, A CORPORATION OF NEW YORK.

PROCESS OF PRODUCING BENZYL ALCOHOL.

1,416,859.  Specification of Letters Patent.  Patented May 23, 1922.

No Drawing.  Application filed May 18, 1921. Serial No. 470,686.

*To all whom it may concern:*

Be it known that I, RALPH E. MONTONNA, a citizen of the United States, residing at Syracuse, in the county of Onondaga and State of New York, have invented a new and Improved Process of Producing Benzyl Alcohol, of which the following is a specification.

It has heretofore been known that benzyl alcohol can be produced by hydrolyzing benzyl chloride with an alkali. The product of this process is, however, always contaminated with chlorine compounds and is therefore, unfit for the commercial uses to which benzyl alcohol is applied as, e.g., the manufacture of perfumes.

It is also known that calcium chloride combines with alcohols to give insoluble crystalline compounds but its action on benzyl alcohol is extremely slow at ordinary temperatures and in order to obtain any appreciable quantity of the compound a boiling temperature has to be employed.

The object of my improvements is to enable the utilization of crude benzyl chloride as an economical source of benzyl alcohol and to obtain therefrom a pure product free from chlorine compounds and thus suitable for any use to which it may be adapted.

In carrying my invention into effect I mix with crude benzyl alcohol a chlorine free solvent of the benzyl alcohol and of the contained impurities which will not of itself react with calcium chloride, e.g., benzol or toluol. This is then treated with a dehydrating agent, as sodium carbonate, or anhydrous sodium sulphate, to remove any water present. I then add anhydrous calcium chloride in quantity substantially equal to the benzyl alcohol. Combination of the calcium chloride and benzyl alcohol takes place at ordinary temperatures, with evolution of heat, forming a thick pasty mass consisting of a crystalline compound of benzyl alcohol and calcium chloride, mixed with or suspended in the solvent employed. This is allowed to stand for several hours and the crystalline compound is then separated from the solvent by filtration the dissolved impurities remaining in the solvent, and the filter cake is washed with benzol or other solvent of the class first employed, to remove any adhering benzyl chloride or other chlorine containing impurities.

The crystalline deposit is then stirred with water to decompose the compound of benzyl alcohol and calcium chloride, the latter going into solution with the water and the purified benzyl alcohol separating as an oily layer.

This is then drawn off and treated with a dehydrating agent and afterward distilled giving pure benzyl alcohol.

Example: 100 parts of crude benzyl alcohol, obtained by the hydrolysis of benzyl chloride with an alkali, are dissolved in 200 parts of benzol, dried with 5 to 10 parts sodium carbonate, filtered and stirred with 100 parts powdered anhydrous calcium chloride. The thick, pasty emulsion which forms with liberation of heat, is allowed to stand for several hours and is then filtered and the filter cake is then washed with approximately 200 parts of benzol.

The filter cake is then stirred with 125 parts of water, the resulting oily layer is separated from the calcium chloride solution, dried with sodium carbonate and then distilled. The resulting alcohol is free from chlorine.

What I claim as new and desire to secure by Letters Patent is:—

1. The process of producing chlorine-free benzyl alcohol which consists in combining crude benzyl alcohol and calcium chloride, breaking up the compound to set free benzyl alcohol and separating the benzyl alcohol from the residue.

2. The process of producing chlorine-free benzyl alcohol which consists in combining crude benzyl alcohol and calcium chloride, breaking up the resulting compound with water and separating the freed benzyl alcohol.

3. The process of producing chlorine-free benzyl alcohol which consists in combining crude benzyl alcohol and calcium chloride, breaking up the resulting compound with water, and separating, drying and distilling the freed benzyl alcohol.

4. The process of producing chlorine-free benzyl alcohol which consists in dissolving crude benzyl alcohol in a chlorine-free solvent of the alcohol and its chlorine containing impurities which will not of itself react with calcium chloride, forming therewith a compound of benzyl alcohol and calcium chloride and separating the compound from the solvent, breaking up the compound with water and separating the freed benzyl alcohol.

5. The process of producing chlorine-free benzyl alcohol which consists in dissolving crude benzyl alcohol in a chlorine-free solvent which will not of itself react with calcium chloride, forming therewith a compound of benzyl alcohol and calcium chloride and separating the compound from the solvent by filtration and removing adhering impurities from the filter cake, breaking up the formed compound with water and separating the freed benzyl alcohol and finally drying and distilling the benzyl alcohol.

6. The process of producing chlorine-free benzyl alcohol which consists in dissolving crude benzyl alcohol in a chlorine-free solvent which will not of itself react with calcium chloride, drying the solution and forming therewith a compound of benzyl alcohol and calcium chloride, separating the compound from the solvent by filtration, washing the filter cake with a solvent of the class first employed to remove adhering impurities, breaking up the compound with water and separating the freed benzyl alcohol and finally drying and distilling the benzyl alcohol.

7. In the process of producing chlorine-free benzyl alcohol the method of freeing a compound of benzyl alcohol and calcium chloride from adhering impurities which consists in washing the compound with a chlorine-free solvent of the impurities which will not react with calcium chloride.

In testimony whereof I affix my signature, this 13th day of April, 1921.

RALPH E. MONTONNA.